US005439147A

United States Patent [19]

Bitschnau

[11] Patent Number: 5,439,147

[45] Date of Patent: Aug. 8, 1995

[54] CONTAINER FOR INTRODUCING CONCRETE INTO FORMWORK

[75] Inventor: Lothar Bitschnau, Bartholomäberg, Austria

[73] Assignee: MST-BAU GESMBH, Fussach, Austria

[21] Appl. No.: 164,386

[22] Filed: Dec. 9, 1993

[30] Foreign Application Priority Data

Dec. 22, 1992 [AT] Austria ............................ A2540/92

[51] Int. Cl.6 ............................................ G01F 11/20

[52] U.S. Cl. .................................. 222/333; 222/413; 414/326; 417/900

[58] Field of Search ............... 222/181, 185, 333, 412, 222/413; 198/311, 550.1; 414/326, 526; 417/900

[56] References Cited

U.S. PATENT DOCUMENTS

| | | | |
|---|---|---|---|
| 1,828,317 | 10/1931 | Clapp | 222/413 X |
| 2,569,952 | 10/1951 | Ridley | 222/412 X |
| 2,606,645 | 8/1952 | Heine | 222/413 X |
| 2,686,618 | 8/1954 | Matter | 222/413 X |
| 3,240,400 | 3/1966 | Smith | 222/413 |
| 3,997,087 | 12/1976 | Christensen | 222/413 |
| 4,108,334 | 8/1978 | Moller | 222/412 X |
| 4,335,834 | 6/1982 | Zepkin | 222/333 X |
| 4,426,018 | 1/1984 | Ward | 222/413 X |
| 4,634,347 | 1/1987 | Gauffin et al. | 417/900 X |

FOREIGN PATENT DOCUMENTS

| | | | |
|---|---|---|---|
| 395742 | 7/1992 | Austria . | |
| 0394357 | 4/1924 | Germany . | |
| 1043198 | 11/1958 | Germany | 222/413 |
| 1116129 | 10/1961 | Germany | 222/413 |
| 1845383 | 1/1962 | Germany . | |
| 1531934 | 9/1969 | Germany . | |
| 1584554 | 2/1970 | Germany . | |
| 2136365 | 2/1973 | Germany . | |
| 2250800 | 4/1974 | Germany . | |
| 3148700 | 12/1982 | Germany . | |
| 3534725 | 4/1987 | Germany . | |
| 1206986 | 9/1970 | United Kingdom | 222/413 |

OTHER PUBLICATIONS

"Beton-und Stahlbetonbau" A 1740 E, ISSN 0005-9900, 87. Jahrgang, Oct. 1992-vol. 10.

*Primary Examiner*—Kevin P. Shaver
*Attorney, Agent, or Firm*—Friedrich Kueffner

[57] ABSTRACT

A concrete container for introducing concrete into formwork, particularly into sliding formwork. The container includes an upwardly open container with a downwardly tapering lower portion having an outlet opening. A distributing hose is connected to the outlet opening. The vessel is provided with a support frame. The support frame can be connected to a lifting unit for lifting the concrete container. A pipe section is provided between the outlet opening of the container and the distributing hose. A motor-driven screw is mounted in the pipe section. The motor serving for driving the screw is mounted on the vessel or on the support frame. The axial length of the screw is slightly greater than the axial length of the pipe section. A support beam extending across the vessel is mounted on the upper rim of the vessel. The motor is flanged to the middle portion of the support beam. The drive shaft extends concentrically through the vessel. The pipe section is in alignment with the vertical center axis of the container.

7 Claims, 1 Drawing Sheet

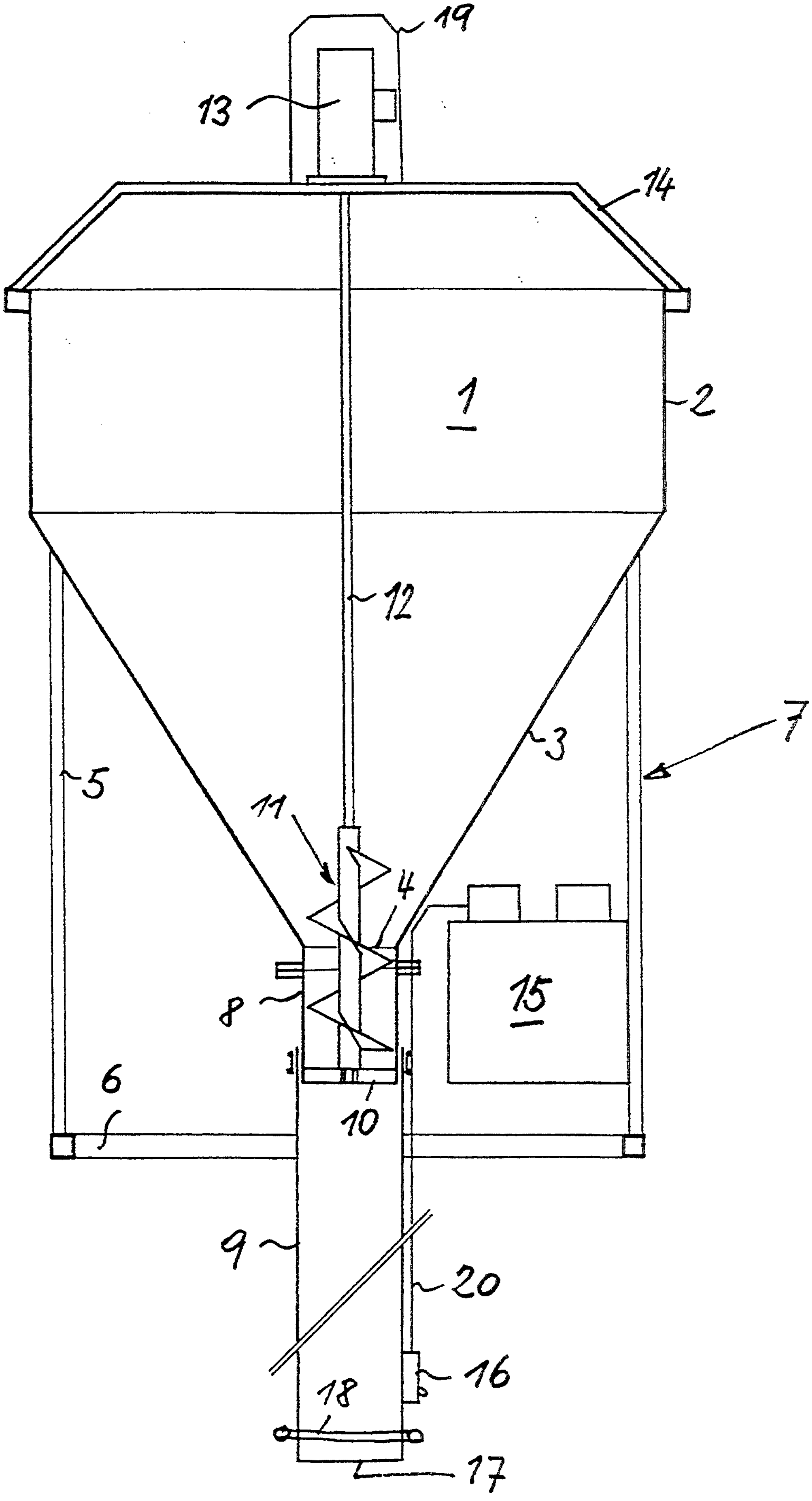
19
13
14
1
2
12
7
3
5
11
4
15
8
6
10
9
20
16
18
17

CONTAINER FOR INTRODUCING CONCRETE INTO FORMWORK

BACKGROUND OF THE INVENTION

1. Field of the Invention

The present invention relates to a concrete container for introducing concrete into formwork, particularly into sliding formwork. The concrete container is composed of a vessel which is open toward the top and a bottom portion which tapers inwardly toward the bottom. The bottom portion has an outlet opening to which a distributing hose is connected. The container may be placed in a support frame. The container additionally has suspension means for connecting the container to a lifting unit. A pipe section is provided between the outlet opening of the container and the distributing hose.

2. Description of the Related Art

In civil engineering, concrete containers as they are known from DE-OS 21 36 365 are used for filling formwork with concrete when constructing buildings. In the simplest embodiment, the concrete container has an outlet opening with an outlet chute and a sliding flap which can be actuated by means of a pivotally mounted lever. The concrete container suspended from a lifting unit is placed adjacent to a concrete transporter and is filled with concrete through a filling chute. The concrete container filled in this manner is lifted by the lifting unit and is carried to the location where the concrete is to be filled into the formwork. A worker waiting at this location actuates the lever to open the sliding flap and the concrete slides as a result of its own weight through the outlet opening and through the outlet chute into the formwork. Once the concrete container is emptied in this manner, the above-mentioned lever is used for closing the sliding flap and, subsequently, the concrete container is returned by means of the lifting unit to the concrete transporter where the container can once again be filled.

It is already known in a container of the above-described type to provide a connecting piece adapted to the outlet chute, wherein the connecting piece is connected to a distributing hose, on the one hand, and, on the other hand, can be moved over the outlet chute and anchored to the container. Such connecting pieces with distributing hoses are used in these concrete containers when the location where the concrete is to be poured cannot be reached directly with the outlet chute. These concrete containers have an inclined outlet, so that the hose connected thereto is not squeezed by the support frame of the concrete container when the container is placed on the ground. Concrete containers of this type have been found very useful in those formworks in which the upper edge of the formwork is essentially freely accessible. This is usually the case when the formwork is used in the construction of residences and apartment buildings.

However, the accessibility of a formwork is severely impaired when the formwork is a sliding formwork as it is used preferably in the construction of tower-like buildings. Such a formwork is disclosed, for example, in Austrian Patent 395,742. In this case, the formwork or formwork portions are suspended from support yokes which usually support work platforms arranged on both sides of the building to be erected and which carry the formwork itself. In addition, reinforcement steel members project upwardly to a significant height and closely next to each other (Title page "Beton-und Stahlbetonbau" [Concrete and Reinforced Concrete Construction] Volume 10/92, Year 87). Sliding formworks of this type can no longer be filled with concrete containers of the above-described type which only have one outlet chute because the work platforms and reinforcement steel members and similar equipment make it impossible to move the concrete container closely enough to the edge of the formwork. For this reason, as explained above, such concrete containers are equipped with a distributing hose, wherein a sliding flap is provided between hose and outlet opening of the container. In addition, a platform is fastened to the support frame of a concrete container. A worker who has to operate this sliding flap is standing on this platform. A second worker guides the outlet opening of the hose which usually is several meters long to the filling area of the formwork. When the second worker gives the appropriate command, the worker standing on the platform operates the sliding flap. Since the concrete must be poured continuously when a sliding formwork is used, a worker must constantly man the concrete container. This worker is transported together with the container and his only task is to open and close the sliding flap upon the command of another worker. This type of operation is not particularly economical.

In order to improve upon this type of operation, the sliding flap has also already been arranged at the outlet opening of the distributing hose, so that the worker who guides the hose can also actuate the sliding flap. As a rule, in order to ensure accessibility to the edge of the formwork, the distributing hoses have a length of six to seven meters and a diameter of approximately 20 centimeters. In this case, the distributing hose is entirely filled with concrete and, therefore, is extremely heavy, so that usually two workers are required for operating the end piece of the distributing hose equipped with the sliding flap. In addition, it cannot be excluded that the projecting reinforcing steel members damage and rip open the distributing hose during the severe operating conditions as they exist on a construction site. In this case, when the concrete container is full, the entire contents would drop onto any workers standing below. It is to be noted that the concrete in the containers has a weight of several tons.

SUMMARY OF THE INVENTION

Therefore, it is the primary object of the present invention to further develop a concrete container of the above-described type in such a way that all of the above-discussed disadvantages are avoided.

In accordance with the present invention, a motor-driven screw is mounted in the pipe section provided between the outlet opening of the container and the distributing hose. The motor used for driving the screw is fastened on the container or on the support frame for the container.

The present invention makes it possible to work with and manipulate the hose in the empty state in which it has a light weight, so that the hose opening can be moved easily. The discharge of concrete can be controlled by means of the screw.

In accordance with another feature of the present invention, the axial length of the screw corresponds to the axial length of the pipe piece or is somewhat longer than the pipe piece, so that the screw can project with its upper portion into the container and, thus, can ensure the flow of the concrete, particularly if relatively dry concrete has to be processed.

If the motor is fastened at the upper edge of the container and the drive shaft provided between the motor and the screw extends freely through the container, additional agitating blades can be welded to the drive shaft which serve to loosen the concrete and ensure the flowability thereof.

In accordance with another feature of the present invention, a support beam, preferably with two bends, is provided at the upper edge of the container in a plane defined by the diameter thereof. The motor is flanged to the middle portion of the support beam. The drive shaft concentrically extends through the container and the pipe section is in alignment with the vertical center axis of the container, so that blades attached to the drive shaft can cover the entire cross section of the container and also the entire internal height thereof.

Since the lifting units which are used for transporting such concrete containers from the filling station to the emptying location travel over significant distances, it is useful to drive the motor by means of a current source which is fastened to the concrete container or to the support frame of the concrete container, so that cable supply lines can be avoided. In accordance with a useful feature, actuating units are provided at the opening of the distributing hose for controlling the current source and/or the motor driven by the current source, so that the operator who manipulates the opening of the distributing hose can simultaneously operate the motor and, thus, control the supply of concrete from the container. The motor-driven screw not only serves as a conveying means, but also simultaneously as a closing member for the outlet opening of the container if the average pitch of the screw is selected in such a way that the concrete in the container is prevented from flowing out by the non-rotating screw. In accordance with a useful feature, the average pitch of the screw extends at an angle of less than 45°, for example 30°.

In order to ensure that the manipulation of the distributing hose which frequently is several meters long does not become too difficult, another feature provides that the diameter of the outlet opening, of the hose and of the opening of the hose is smaller than 20 cm, for example, 15 cm.

The various features of novelty which characterize the invention are pointed out with particularity in the claims annexed to and forming a part of the disclosure. For a better understanding of the invention, its operating advantages, specific objects attained by its use, reference should be had to the drawing and descriptive manner in which there are illustrated and described a preferred embodiment of the invention.

BRIEF DESCRIPTION OF THE DRAWING

In the drawing:

The single figure of the drawing schematically illustrates a concrete container according to the present invention for introducing concrete into formwork.

DETAILED DESCRIPTION OF THE PREFERRED EMBODIMENT

As illustrated in the drawing, a vessel 1 of the concrete container has an upper portion 2 which is essentially cylindrical and a bottom portion 3 which conically tapers downwardly and is provided with an outlet opening 4. Vertical supports 5 and transverse supports 6 form a support frame 7 for making it possible to place the concrete container on the ground.

A pipe section 8 is flanged to the outlet opening 4. A flexible distributing hose is fastened to the pipe section 8. A star-support 10 is fastened in the area of the lower end of the pipe section 8. An end of a screw 11 is rotatably mounted in the support 10. The screw 11 has a length which is somewhat greater than the length of the pipe section 8, so that the upper end of the screw 11 projects into the lower portion 3 of the vessel. A drive shaft 12 extends concentrically through the vessel. The drive shaft 12 is connected to a motor 13 which is flanged onto a support beam 14 having two bends. The support beam 14, in turn, is fastened in a diameter plane of the cylindrical upper portion 2 and is fastened to the edge of the upper portion 2. A current supply unit 15 is mounted within the support frame 7. The unit 15 provides the energy required for driving the motor 13. The unit 15 and/or the motor 13 are controllable through an actuating member 16 arranged in the area of the opening 17 of the flexible distributing hose 9.

The average pitch of the screw 11 is selected in such a way that the concrete in the vessel 1 is prevented from flowing out when the screw is not rotating. Advantageously, the average pitch of the screw 11 is smaller than 45°, for example, 30°.

The distributing hose 9 has a length of several meters, for example, six to seven meters. A grip ring 18 may be fastened at the opening 17 for manipulating the end of the hose 9 with the opening 17.

As a result of the configuration according to the present invention, one of the workers who was previously required for operating the concrete container is no longer needed. In addition, when the screw 11 does not rotate, the hose 9 is empty and can be manipulated without requiring special force. The non-rotating screw simultaneously acts as a locking member, so that a previously necessary sliding flap and the lever mechanism for operating the sliding flap are no longer necessary. The motor 13 is preferably covered by means of a protective cover 19 and, thus, is protected against mechanical damage.

In the illustrated embodiment, the pipe section 8 is in alignment with the vertical center axis of the vessel 1. In accordance with another solution, the pipe section is inclined relative to this vertical center axis, so that the axis of the pipe section is essentially located parallel to the generatrices of the downwardly tapering lower portion. In this case, the drive shaft 12 is also inclined and the motor 13 is mounted at the edge of the vessel on an appropriately constructed bracket. However, in this case, it is necessary and useful to arrange a bend in the transition area between pipe section 8 and hose 9. However, this solution is considered to be less advantageous, but is mentioned to be complete.

In the illustrated embodiment, the motor is flanged to the support beam 14. It is basically possible to support the motor within the vessel 1 immediately above the end of the screw 11. In this case, an appropriate star-type support would have to be provided for supporting the motor. This star-type support would have to rest with its outer side on the inner wall of the lower portion 3. In this case, the motor would have to be completely enclosed.

In another embodiment, the support frame 7 could be completely omitted. The current supply unit 15 would then have to be mounted on a bracket provided on the vessel 1. In this case, the placement possibilities of the container are limited. However, these possibilities are useful when the container is filled or has to be placed at certain locations.

In the illustrated embodiment, the screw 11 has a relatively short length, i.e., the length of the screw 11 is short relative to the height of the vessel 1. However, it is conceivable that the screw extends through the entire vessel.

In the illustrated embodiment, the current supply unit 15 or the motor 13 are controlled through a line 20 (for simplicity's sake, the line connecting the motor and the current supply unit is not illustrated). However, it is within the scope of the present invention to provide a remote control for the unit 15 or the motor 13. It is also possible to replace the unit 15 by rechargeable batteries.

While containers with discharge screws are known in the art, for example, from DE-AS 15 31 934, DE-PS 35 34 735, and DE-GM 18 45 383, these containers are only used for storage purposes of flowable materials and are not suitable for a concrete container of the above-described type and cannot replace the screw arrangement of the concrete container according to the present invention.

The invention is not limited by the embodiments described above which are presented as examples only but can be modified in various ways within the scope of protection defined by the appended patent claims.

I claim:

1. A concrete container for introducing concrete into framework, the container comprising a vessel having a top and a bottom, a support frame for supporting the vessel, the vessel being open at the top thereof and having a downwardly and inwardly tapering lower portion, the lower portion defining an outlet opening, a pipe section connected to the outlet opening, and a distributing hose for introducing concrete into formwork connected to the pipe section, further comprising a screw mounted within pipe section, a motor for driving the screw, the motor for driving the screw being mounted on the vessel, a current source for the motor mounted on the support frame, actuating members for controlling the current source, the actuating members being mounted at an opening of the distributing hose, the pipe section having a length, the screw having an axial length which corresponds to or is slightly greater than the axial length of the pipe section, the screw having an average pitch selected smaller than 45° for preventing concrete from flowing out of the vessel when the screw is not rotating.

2. The concrete container according to claim 1, wherein the average pitch of the screw is 30°.

3. The concrete container according to claim 1, wherein the vessel has an upper rim, the motor being mounted on the upper rim, further comprising a drive shaft freely extending through the vessel between the motor and the screw.

4. The concrete container according to claim 3, further comprising a support beam mounted on the upper rim of the vessel, the support beam extending in a plane defined by the diameter of the upper rim, wherein the motor is flanged to the support beam in a middle portion thereof, wherein the drive shaft concentrically extends through the vessel, and wherein the pipe section is in alignment with a vertical center axis of the vessel.

5. The concrete container according to claim 4, wherein the support beam has two outer portions extending at an angle relative to the middle portion.

6. The concrete container according to claim 1, wherein the outlet opening, the distributing hose and an opening of the distributing hose have a diameter which is smaller than 20 cm.

7. The concrete container according to claim 6, wherein the diameter is 15 cm.

* * * * *